(12) United States Patent
Shuai

(10) Patent No.: US 8,385,954 B2
(45) Date of Patent: Feb. 26, 2013

(54) METHOD FOR AUTOMATICALLY RESPONDING TO MOBILE PHONE SHORT MESSAGES

(75) Inventor: Jun Shuai, Shenzhen (CN)

(73) Assignee: Huizhou TCL Mobile Communication Co., Ltd., Zhongkai Hi-Tech Development District, Huizhou, Guangdong (CN)

(*) Notice: Subject to any disclaimer, the term of this patent is extended or adjusted under 35 U.S.C. 154(b) by 0 days.

(21) Appl. No.: 12/995,103

(22) PCT Filed: Feb. 5, 2010

(86) PCT No.: PCT/CN2010/070526
§ 371 (c)(1),
(2), (4) Date: Nov. 29, 2010

(87) PCT Pub. No.: WO2010/094222
PCT Pub. Date: Aug. 26, 2010

(65) Prior Publication Data
US 2011/0077033 A1 Mar. 31, 2011

(30) Foreign Application Priority Data
Feb. 23, 2009 (CN) .......................... 2009 1 0105526

(51) Int. Cl.
*H04L 12/58* (2006.01)
*H04M 3/00* (2006.01)
*H04W 68/00* (2009.01)
*H04W 4/00* (2009.01)

(52) U.S. Cl. ..................... 455/466; 455/412.1; 455/418; 455/460

(58) Field of Classification Search .................. 455/401, 455/412.1–412.2, 415, 466, 550.1, 556.2, 455/564, 414.1, 414.4, 417–418, 460–461, 455/557, 560–561, 566–567, 569.1–569.2
See application file for complete search history.

(56) References Cited

U.S. PATENT DOCUMENTS

| | | | | |
|---|---|---|---|---|
| 6,718,187 | B1* | 4/2004 | Takagi et al. | 455/569.2 |
| 7,024,178 | B2* | 4/2006 | Uchimura | 455/412.1 |
| 7,328,031 | B2* | 2/2008 | Kraft | 455/466 |
| 7,865,176 | B2* | 1/2011 | Bell et al. | 455/412.1 |
| 7,881,736 | B2* | 2/2011 | Celik et al. | 455/466 |
| 2002/0085689 | A1* | 7/2002 | Chin | 379/88.13 |
| 2007/0238474 | A1* | 10/2007 | Ballas et al. | 455/466 |
| 2008/0263158 | A1* | 10/2008 | del Cacho et al. | 709/206 |
| 2009/0143084 | A1* | 6/2009 | Cheng | 455/466 |
| 2009/0325604 | A1* | 12/2009 | Hsu | 455/456.2 |
| 2010/0151827 | A1* | 6/2010 | Goyal et al. | 455/412.1 |
| 2010/0273450 | A1* | 10/2010 | Papineau et al. | 455/411 |

FOREIGN PATENT DOCUMENTS
WO WO 2007/037592 A1 * 4/2007

* cited by examiner

*Primary Examiner* — Meless Zewdu
(74) *Attorney, Agent, or Firm* — Shimokaji & Assoc., PC

(57) ABSTRACT

The present invention provides a method for automatically responding to mobile phone short messages, comprising the following steps: step a, set a short message auto responding number and auto responding content; step b, when receiving a new message, judge whether the sender number of the new message needs an auto response; step c, if the number needs an auto response, respond the auto responding message to the sender of the short message. The method for automatically responding to mobile phone short messages provided in the invention can auto respond short messages to one or some phone numbers according to the requirement of a user, and can input auto responding content according to the requirement of the user, thus greatly helping the user respond a short message in time on special occasions.

5 Claims, 3 Drawing Sheets

METHOD FOR AUTOMATICALLY RESPONDING TO MOBILE PHONE SHORT MESSAGES

TECHNICAL FIELD

The present invention relates to the field of the mobile phone, especially a method for automatically responding to mobile phone short messages.

BACKGROUND ART

As mobile phones are widely used, the mobile phone short messages are also used more and more frequently. Generally speaking, when receiving new short messages, a mobile phone will immediately play the preset ring tone to alert the user to new short messages so that the user can make a reply in time. However, on special occasions, for example, the user is not able to carry the mobile phone around (in a confidential meeting or having an exam in an examination room, etc.) or is not able to operate the mobile phone in time (for example, having a call right the moment), the short messages cannot be replied in time, which causes inconvenience to the user's communication.

SUMMARY OF THE INVENTION

The present invention aims to provide a method for automatically responding to mobile phone short messages, and intends to overcome the defect of the prior art of failing to respond to short messages in time on special occasions.

The method for automatically responding to mobile phone short messages provided in the invention comprises the following steps:

Step a, set a short message auto responding number and auto responding content;

Step b, when receiving a new short message, judge whether the sender number of the new short message needs an auto response; and Step c, if the number needs an auto response, respond the auto responding short message to the sender of the short message.

In addition, step a further comprises the following steps: open the phonebook of a mobile phone and select a number, and open the auto responding function of the number, then input the content of the auto responding short message.

Still further, step a further comprises the following steps: open the phonebook of a mobile phone, open the auto responding function of all the numbers, then input the content of the auto responding short message.

Still further, in step c, the mobile phone is set in the quiet mode first, before the auto responding short message is sent to the sender of the short message.

Still further, in step c, after the auto responding short message is sent to the sender of the short message, the sent short message is saved in the sent box and marked as auto response.

The method for automatically responding to mobile phone messages provided in the invention can auto respond short messages to one or some phone numbers according to the requirement of a user, and can input auto responding content according to the requirement of the user, thus greatly helping the user respond a short message in time on special occasions.

BRIEF DESCRIPTION OF ACCOMPANYING DRAWINGS

DETAILED DESCRIPTION OF THE PREFERRED EMBODIMENTS

In order to make the purpose, the technical solutions and the advantages of the present invention clearer, the following text will further explain the invention in details by referring to the accompanying drawings and embodiments. It should be understood that the detailed embodiment herein described is used only to explain but not to limit the invention.

The method for automatically responding to mobile phone short messages provided in the invention comprises the following steps:

Step a, set a short message auto responding number and auto responding content;

Step b, when receiving a new short message, judge whether the sender number of the new short message needs an auto response;

Step c, if the number needs an auto response, respond the auto responding short message to the sender of the short message.

In the following, the above steps will be explained in details based on the accompanying drawings.

Figure 1:
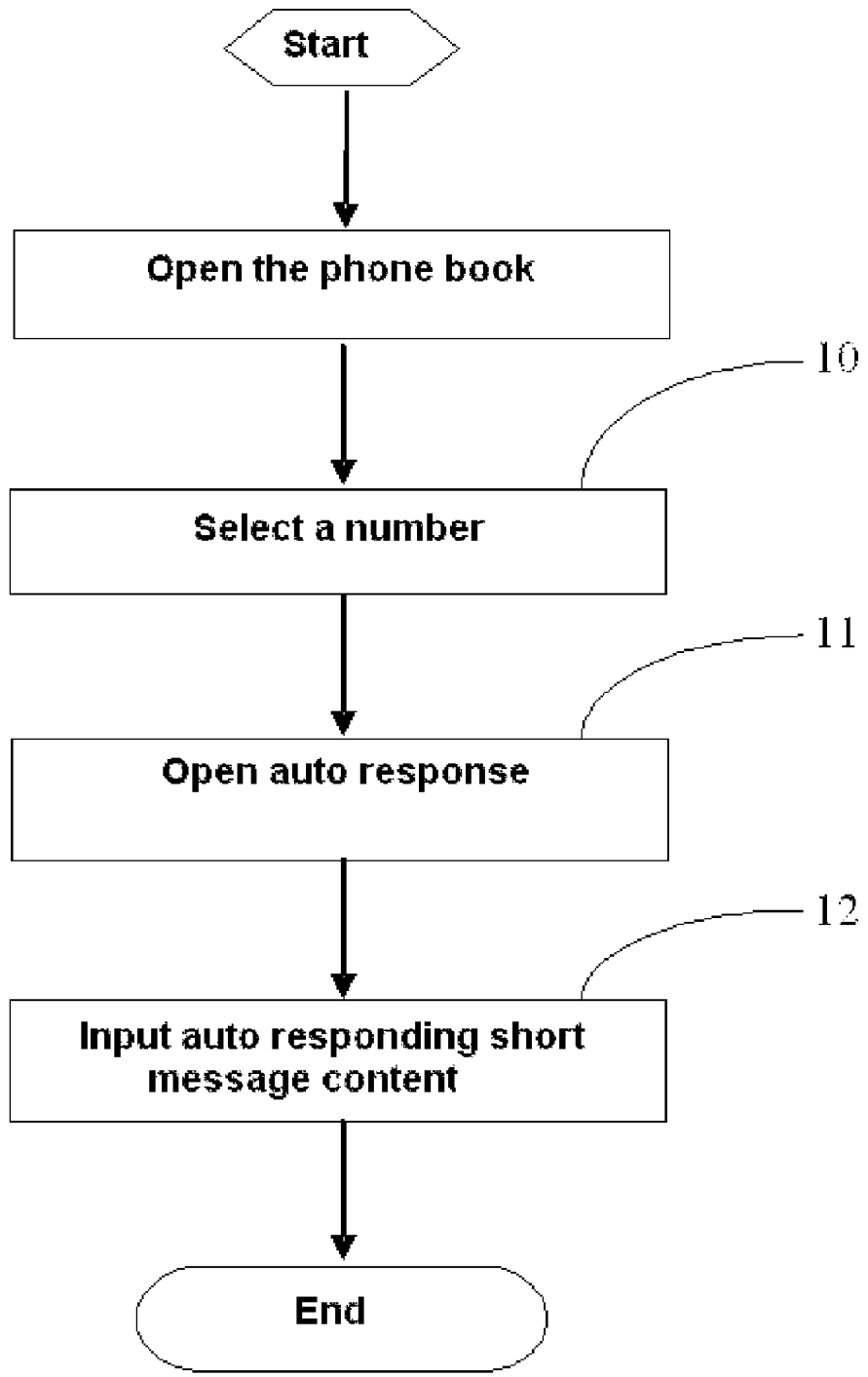
FIG. 1 is a process diagram of setting auto response of short messages according to the present invention.

As shown in FIG. 1, the specific implementing process of setting short message auto responding number and auto responding content as stated in step a is as follows:

First, open the phonebook of the mobile phone, select a number in step 10, open auto responding function of the number in step 11, and carry out step 12 to input the content of the auto responding short message. In such a way, the auto responding setting for one mobile phone number is finished. Or, more than one phone numbers or even all the mobile phone numbers in the phone book can be directly set as auto responding, and the content of the auto responding short message may be "inconvenient to reply short messages at the moment, I will reply to you later", etc.

Figure 2:
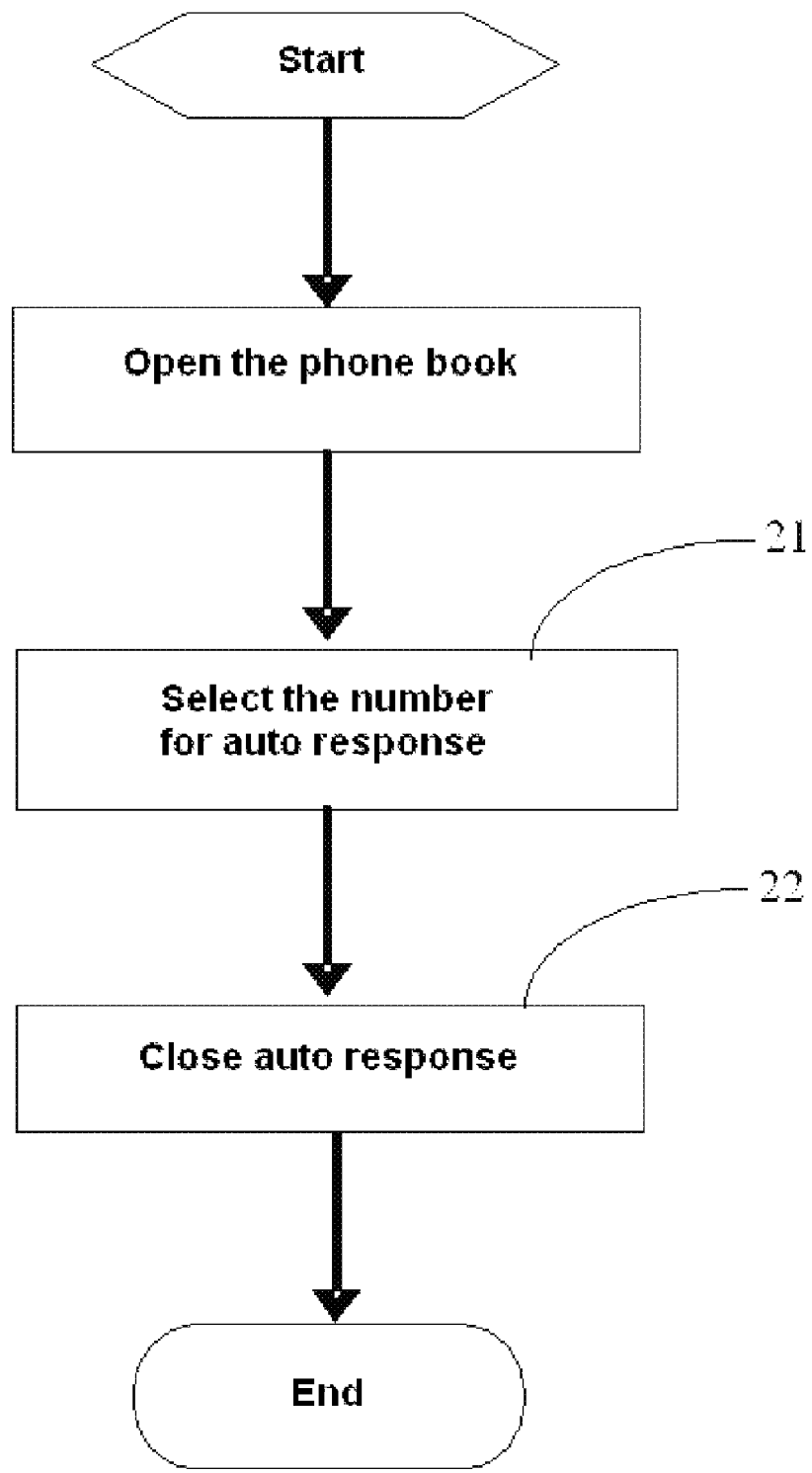
FIG. 2 is a process diagram of closing auto response of short messages according to the present invention.

Certainly, as shown in FIG. 2, the function of auto responding short messages can also be closed. Select the number for auto response in step 21, and close the auto responding function in step 22.

Figure 3:
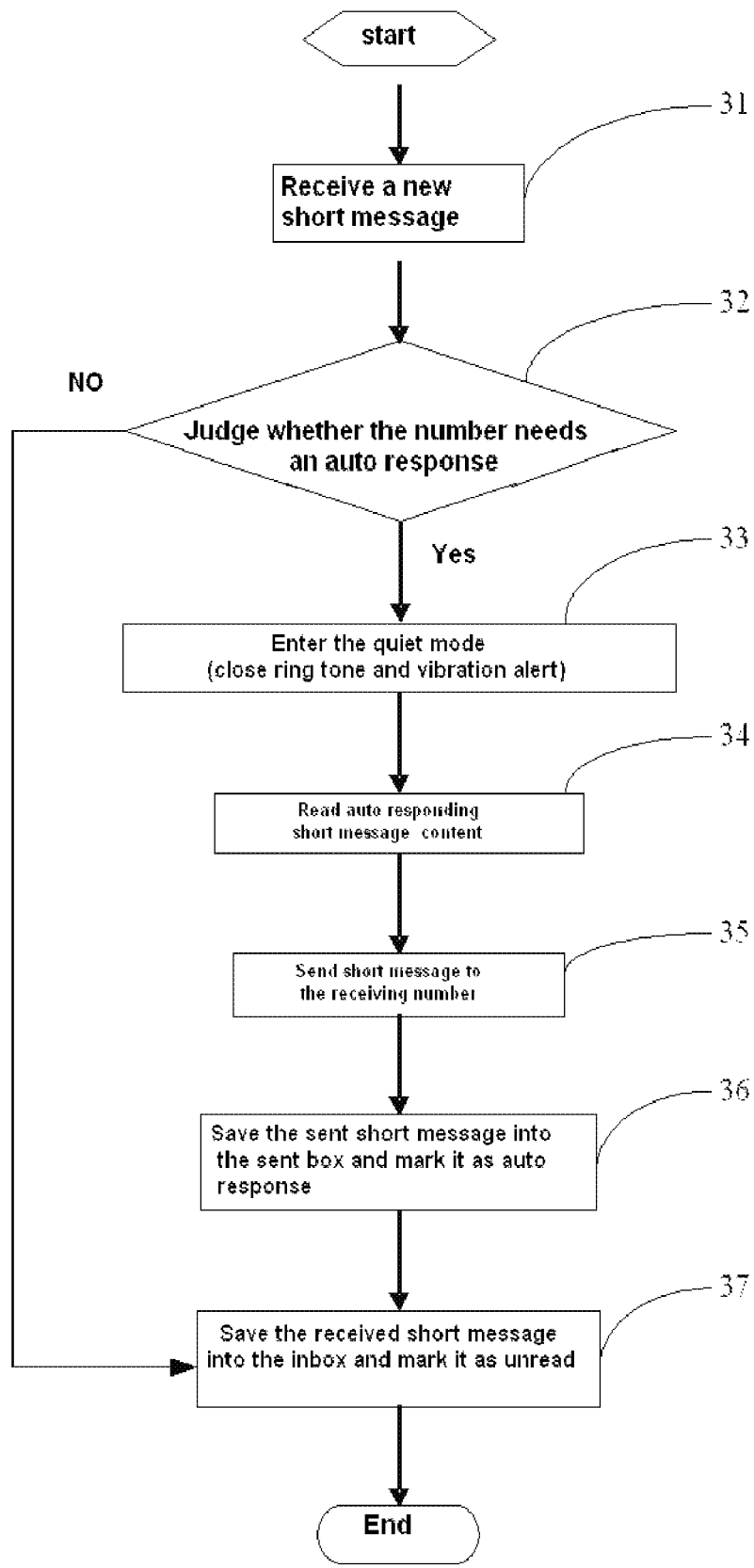
FIG. 3 is a process diagram of auto responding short messages according to the present invention.

As shown in FIG. 3, after receiving a new short message in step 31, judge whether the sender number (hereinafter referred to as number p) of the new message needs an auto response (i.e., the above step b, judge whether short message auto responding function is set to the number) in step 32, and if there is no need of auto response, then carry out step 37 directly to save the received short message into inbox and mark it as read. If it needs an auto response, then carry out step 33 to enter the quiet mode (close ring tone and vibration alert), carry out step 34 to read auto responding short message content and send the auto responding short message to the above number p in step 35, and save the sent short message into the sent box in step 36 and mark it as auto response, and finally carry out step 37 to save the received short message into the inbox and mark it as unread, which is convenient for the user to have a check.

The invention can auto respond short messages to one or some phone numbers according to the requirement of a user, and can input auto responding content according to the requirement of the user, thus greatly helping the user to respond a short message in time on special occasions.

The above mentioned is only a preferred embodiment of the present invention, and cannot be used to limit the invention. Any amendments, equivalent replacement, improvement and so forth that are made within the spirit and principle of the present invention should fall within the protection scope as claimed in the claims of the present invention.

The invention claimed is:

1. A method for automatically responding to short messages by a mobile phone, wherein said mobile phone comprises a processor and a memory, wherein the memory has computer usable program code embodied therewith, the method comprising:

turning on an auto responding function for a first one of a plurality of telephone numbers;

determining without user input whether a received call number is the same as said first one of the plurality of telephone numbers for which the auto responding function is turned on, when receiving a first received short message from a sender;

sending a first sent short message as an auto response of the auto responding function by the processor of said mobile phone to said sender of the first received short message without waiting for a user to press a key on said mobile phone when the first received short message needs an auto response; and saving the first sent short message and marking the first sent short message as automatically responded to.

2. The method according to claim 1, further comprising:
opening a phonebook of said mobile phone;
selecting one of a plurality of telephone numbers in a phonebook of said mobile phone, and
setting the auto responding function of the selected one of the plurality of telephone numbers in the phonebook of said mobile phone, then
inputting text into the mobile phone to be sent as the first sent short message.

3. The method according to claim 1, further comprising:
opening a phonebook of said mobile phone,
opening the auto responding function for a plurality of telephone numbers in the phonebook of said mobile phone, and
inputting text into the mobile phone to be sent as the first sent short message.

4. The method according to claim 1, including closing a ring tone and a vibration alert for said mobile phone in response to the received call number being the same as said first one of the plurality of telephone numbers.

5. The method according to claim 1, wherein the auto responding function is performed without further user input including when the user is unavailable.

* * * * *